(12) United States Patent
Reddy et al.

(10) Patent No.: US 8,799,841 B2
(45) Date of Patent: Aug. 5, 2014

(54) DESIGNING ANALOG CIRCUITS

(75) Inventors: Subodh M. Reddy, San Jose, CA (US);
Toshiyuki Shibuya, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/434,598

(22) Filed: Mar. 29, 2012

(65) Prior Publication Data

US 2013/0263072 A1 Oct. 3, 2013

(51) Int. Cl.
*G06F 17/50* (2006.01)
(52) U.S. Cl.
USPC ............ 716/110; 716/104; 716/106; 716/132
(58) Field of Classification Search
USPC .................................. 716/110, 132, 104, 106
See application file for complete search history.

(56) References Cited

U.S. PATENT DOCUMENTS

| | | | |
|---|---|---|---|
| 2008/0016483 A1* | 1/2008 | Chan | 716/11 |
| 2009/0300570 A1* | 12/2009 | Chan | 716/11 |
| 2010/0083196 A1* | 4/2010 | Liu | 716/2 |

OTHER PUBLICATIONS

Tom Eeckelaert, Trent McConaghy, Georges Gielen "Efficient Multiobjective Synthesis of Analog Circuits using Hierarchical Pareto-optimal Performance Hypersurfaces" Katholieke Universiteit Leuven, Department of Electrical Engineering, 2005.*

* cited by examiner

*Primary Examiner* — Thuan Do
*Assistant Examiner* — Brian Ngo
(74) *Attorney, Agent, or Firm* — Maschoff Brennan

(57) ABSTRACT

According to an aspect of an embodiment, a method of designing an analog circuit may include selecting multiple analog components for a circuit. The method may also include ordering the analog components. The method may also include determining at least one pareto-optimal design point for a parameter of each analog component. The pareto-optimal design point for each analog component may be based on a performance metric, the parameter for the respective analog component, and constraints resulting from pareto-optimal design points for analog components ahead of the respective analog component within the ordering of the analog components.

20 Claims, 5 Drawing Sheets

DESIGNING ANALOG CIRCUITS

FIELD

The embodiments discussed herein are related to analog circuit design.

BACKGROUND

Analog circuit design has become more and more complex as transistors and other analog circuit components have decreased in size, thereby allowing more and more analog components to be included within a single circuit. To optimize the design of a circuit with various analog components, various trade-offs between different parameters of the various analog components may be analyzed. For example, the parameters within an analog circuit may include the size of an inductor, a capacitor, and/or a transistor. Changing one or more of the parameters of the analog components within a circuit may change the output of the circuit. To determine parameters that result in a satisfactory or optimal design, a circuit designer may use an analog circuit modeling tool using transistor level abstractions to explore the entire design space of the analog components of the circuit.

To use the analog circuit modeling tool, the circuit designer may select circuit specifications for the analog components and/or the circuit and input the circuit specifications into the analog circuit modeling tool. The circuit specifications may include information such as the maximum power usage, maximum jitter, minimum bandwidth, among others. The analog circuit modeling tool may use global design techniques to search within the entire design space of the analog circuit at a transistor level abstraction for an optimal or satisfactory design point that satisfies the circuit specifications. Global design techniques typically analyze numerous design points to determine an optimal or satisfactory design point. Large amounts of time may be used to perform the analysis of numerous design points, especially when each design point requires a long analysis.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of designing an analog circuit may include selecting multiple analog components for a circuit. The method may also include ordering the analog components. The method may also include determining at least one pareto-optimal design point for a parameter of each analog component. The pareto-optimal design point for each analog component may be based on a performance metric, the parameter for the respective analog component, and constraints resulting from pareto-optimal design points for analog components ahead of the respective analog component within the ordering of the analog components.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may include a method of designing an analog circuit. In particular, some embodiments described herein may include a method of designing an analog circuit using one or more levels of abstraction higher than a transistor level of abstraction. The higher levels of abstraction for each component within the analog circuit may be based on one or more pareto-optimal design points and/or a pareto-optimal front for the respective component. Using the pareto-optimal design points and/or the pareto-optimal front for the respective components, a pareto-optimization of the circuit may also be obtained.

Embodiments of the present invention will be explained with reference to the accompanying drawings.

Figure 1A:
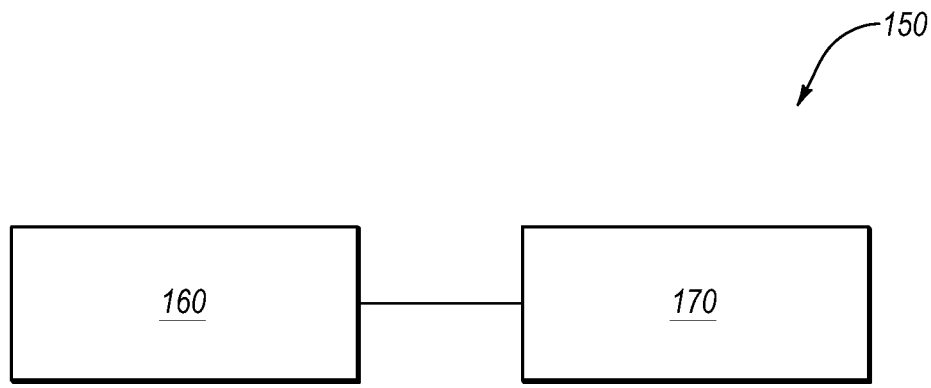
FIG. 1A illustrates an example analog circuit with analog components.

FIG. 1A illustrates an example analog circuit 150 with analog components, arranged in accordance with at least some embodiments described herein. The analog circuit 150 may include a first analog component 160 and a second analog component 170. In some embodiments, the first and second analog components 160, 170 may be simple transistor level components, such as a transistor, resistor, capacitor, inductor, diode, or some other transistor level components. In other embodiments, the first and second analog components 160, 170 may be complex analog components that include one or more transistor level components, such as an op-amp, amplifier, charge pump (CP), voltage controlled oscillator (VCO), multiplexer, demultiplexer, phase locked loop (PLL) that includes a VCO and a CP, or other complex analog component or some combination of complex analog components. In some embodiments, one of the first and second analog components 160, 170 may be a simple transistor level component and the other of the first and second analog components 160, 170 may be a complex analog component.

The first and second analog components 160, 170 may have parameters that may be adjusted. In some embodiments, the parameters may be characteristics of the first and second analog components 160, 170 that may be changed. For example, if the second analog component 170 is a transistor, the parameters of the transistor may include the width, length, doping concentration, or other parameter or characteristic that may be adjusted or changed. As another example, if the first analog component 160 is a VCO, the parameters of the VCO may include the width and/or length of a transistor within the VCO or other parameters of a transistor and a size of a capacitor or inductor within the VCO or other parameters of the capacitor or inductor.

For the same analog component, depending on how the parameters of the analog component are defined, the parameters may be different. For example, if the first analog component 160 is a VCO, a parameter may include a quality factor of the VCO. The quality factor of the VCO may be determined based on set values of components within the VCO, such as the size of transistors, inductors, and capacitors within the VCO. In this example, the quality factor of the VCO may be changed or adjusted. Based on the selected quality factor, the size of the transistors, inductors, and capacitors within the VCO may change as well. In some embodiments, the size of the transistors, inductors, and capacitors within the VCO are changed based on a change of the quality factor and are not changed independent of the quality factor. In contrast, in some embodiments, the parameters of the VCO may be the size of transistors, inductors, and capacitors within the VCO. In these and other embodiments, the size of the transistors, inductors, and capacitors within the VCO may each be changed independently.

The values assigned to all the parameters belonging to an analog component may be referred to as a design point. Thus, a design point may include a number of values equal to a number of parameters for an analog component. A set of all possible design points for the analog component may be referred to as a design space for the analog component. For example, if the first analog component 160 is a transistor with parameters of width, length, and doping concentration, a single design point for the first analog component 160 may be the first analog component 160 having a width at a first value, a length at a second value, and a doping concentration at a third value. Varying the width, length, or doping concentration of the first analog component 160 may change the design point of the first analog component 160. All of the various combinations of different widths, lengths, and doping concentrations may be the design space for the first analog component 160. In some embodiments, the analog circuit 150 may have constraints that may limit the design space for the first analog component 160. For example, if the analog circuit 150 had a minimum power requirement, the width of the first analog component 160 may have a limited range of possibilities to meet the minimum power requirement thereby limiting the design space for the first analog component 160.

The first and second analog components 160, 170 may also have one or more performance metrics. A performance metric may be a measurable quality of the first and second analog components 160, 170 that is affected by the value of the parameters of the first and second analog components 160, 170. Some example performance metrics for various analog components may include power, area, bandwidth, tuning range, noise, phase noise, power supply noise, jitter, among others. For example, if the first analog component 160 is selected as a transistor, the performance metrics of the first analog component 160 may include power, bandwidth, or some other performance metric. In these and other embodiments, a parameter of the first analog component 160, such as a width of the first analog component 160, may affect the power or bandwidth of the first analog component 160.

In some embodiments, one or more of the first and second analog components 160, 170 may have multiple performance metrics. For example, the second analog component 170 may be a VCO and may have performance metrics that include jitter, quality factor, power, area, tuning range, noise, phase noise, power supply noise, as well as other performance metrics. In some embodiments, one or more of the performance metrics of an analog component may be dependent on one or more of the other performance metrics of the analog component. When performance metrics, such as first and second performance metrics of an analog component, are dependent, an increase or decrease in the first performance metric may result in a corresponding increase or decrease in the second performance metric. For example, if the second analog component 170 is a VCO that has performance metrics of power and jitter, an increase in the power may result in reduced jitter and a decrease in power may result in increased jitter. Thus, a change in a parameter that affects power may result in a change in jitter in the second analog component 170.

In some embodiments, different parameters and different values for the parameters may affect different performance metrics differently, even if the performance metrics are dependent. For example, at some design points for an analog component, a change in a value of a parameter of the analog component may result in bettering first and second dependent performance metrics of the analog component. At another design point for the analog component, a change in a value of the parameter of the analog component may result in bettering one of the first and second performance metrics and worsening the other of the first and second performance metric. Design points that result in making one performance metric better and another dependent performance metric worse when a change in a parameter occurs may be referred to as pareto-optimal design points. Multiple pareto-optimal design points may be referred to as a pareto-optimal front.

Figure 1B:
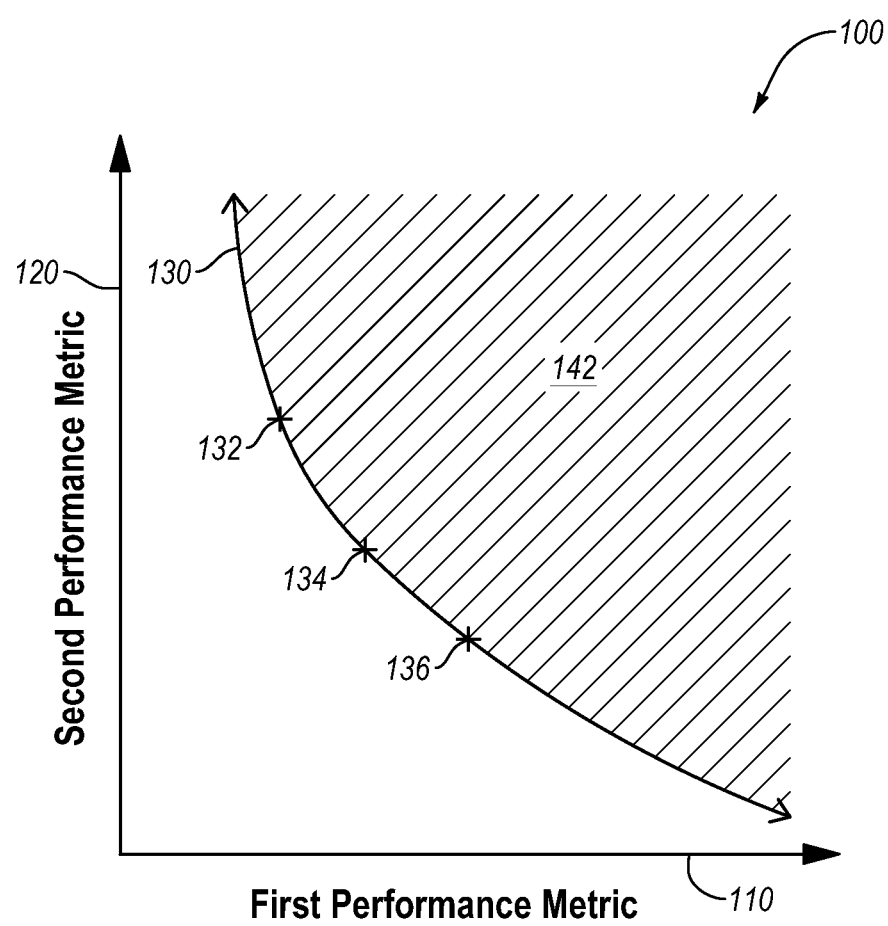
FIG. 1B illustrates an example graph of a pareto-optimal front for an analog component in the analog circuit of FIG. 1A.

FIG. 1B illustrates an example graph 100 of a pareto-optimal front 130 for the first analog component 160 in the analog circuit 150 of FIG. 1A, arranged in accordance with at least some embodiments described herein. The graph 100 includes a first axis 110 that may indicate a value of a first performance metric of the first analog component 160. The graph 100 also includes a second axis 120 that may indicate a value of a second performance metric of the first analog component 160. Both of the first and second performance metrics may be optimized by having lower values. The graph 100 illustrates a design space 142 for the first analog component 160 that is bounded by the pareto-optimal front 130. The graph 100 further illustrates various pareto-optimal design points 132, 134, 136 along the pareto-optimal front 130. Each of the pareto-optimal design points 132, 134, 136 may correspond to the values of the parameters that resulted in the values of the performance metrics in the graph 100.

In the illustrated embodiment of FIG. 1B, two performance metrics have been combined to obtain a pareto-optimal front 130. More generally, multiple performance metrics may be combined to obtain a pareto-optimal surface. For example, 3, 4, 5, or more performance metrics may be combined to obtain a pareto-optimal surface.

With combined reference to FIGS. 1A-1B, and by way of example only, the first analog component 160 may be a VCO with the first performance metric being power and the second performance metric being jitter. In some embodiments, having low power and low jitter may be ideal for the first analog component 160. The pareto-optimal front 130 may thus represent the best obtainable values for low power and low jitter for the first analog component 160 and trade-offs between the power and jitter. As illustrated in the graph 100, trade-offs between the power and the jitter may include having higher power to obtain lower jitter and having higher jitter to obtain lower power. Various parameters for the first analog component 160 may include the sizing of transistors, inductors, and capacitors within the first analog component 160. Numerous design points may exist for varying values of the parameters that are not on the pareto-optimal front 130. In some embodiments, selecting values of parameters for a design point on the pareto-optimal front 130 may allow for better optimization of the first analog component 160 and the analog circuit 150.

Referring again to FIG. 1A, changing a design point of the first analog component 160 may place constraints on the second analog component 170. For example, the first analog component 160 may include a CP and the second analog component 170 may include a VCO. The first analog component 160 may have parameters that include the width of a transistor within the first analog component 160. The width of the transistor may affect the output impedance of the first analog component 160. The output impedance of the first analog component 160 may affect the selection of parameters in the second analog component 170 when optimizing performance metrics of the second analog component 170. Thus, adjusting the parameters of the first analog component 160 may place constraints on the second analog component 170 that affect the selection of parameters in the second analog component 170 and thus the performance metrics of the second analog component 170.

In some embodiments, the first and second analog components 160, 170 may be modeled using parameterized low-level models, such as transistor level modeling. Low-level models may simulate some or all of the physical properties of each of the first and second analog components 160, 170 to determine performance metrics for each of the first and second analog components 160, 170. Alternately or additionally, low-level models may also use empirical models based on non-linear or linear equations to simulate each of the first and second analog components 160, 170. In some embodiments, the low-level models may be referred to as SPICE models. Different low-level models may be used for each of the first and second analog components 160, 170 depending on the selected parameters and/or performance metrics for each of the first and second analog components 160, 170.

In some embodiments, the first and second analog components 160, 170 may be modeled using parameterized high-level models. The high-level models of the first and second analog components 160, 170 may be at a higher level of abstraction than the low-level models described herein. In some embodiments, the high-level models may be based on a hardware description language. For example, the high-level models may be generated using Verilog or Very High Speed Integrated Circuit Hardware Description Language (VHDL). Different high-level models may be used for each of the first and second analog components 160, 170 depending on the selected parameters and/or performance metrics for each of the first and second analog components 160, 170.

Figure 2:
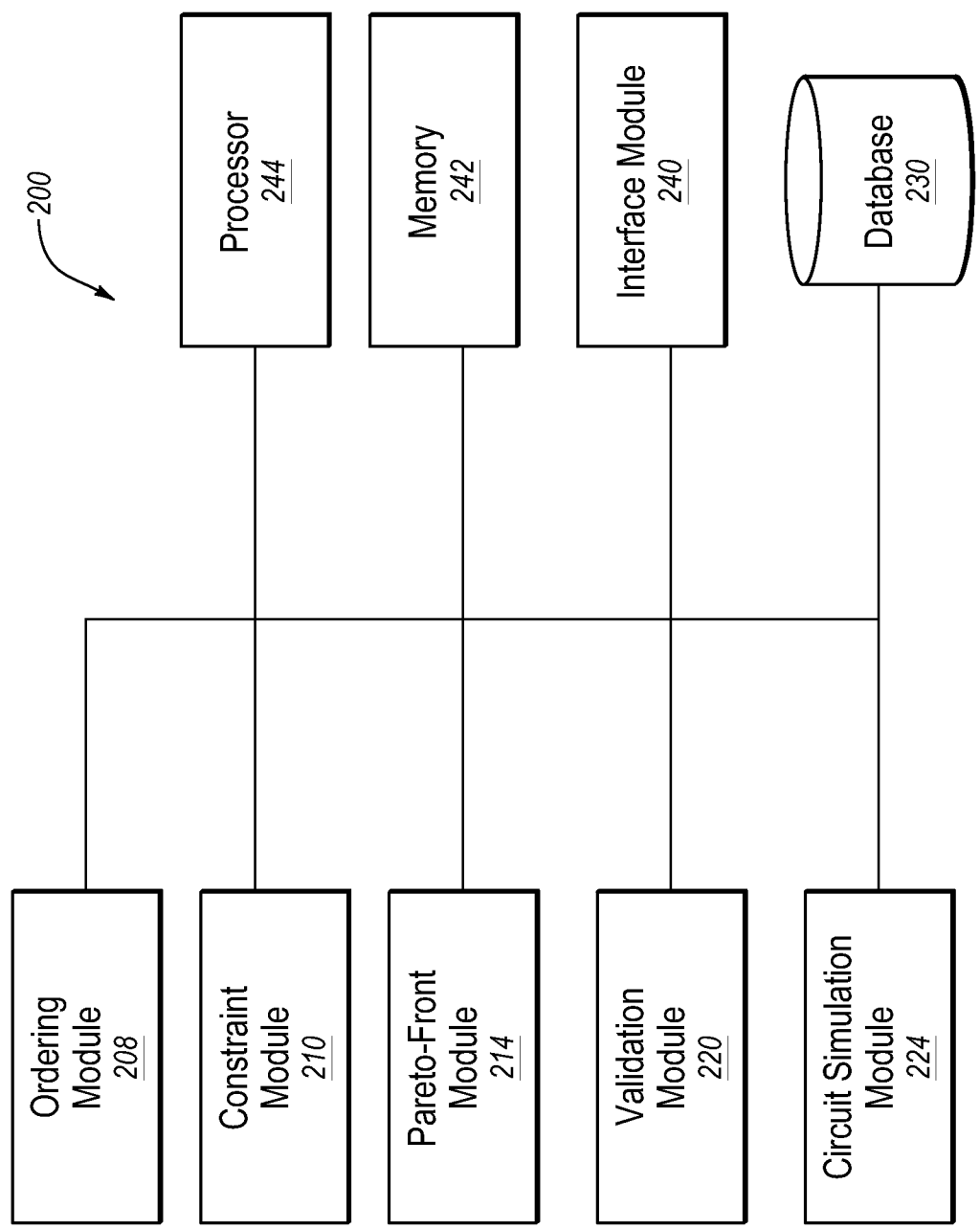
FIG. 2 is a block diagram of an example designing system for optimizing analog circuits.

FIG. 2 is a block diagram of an example designing system 200 for designing analog circuits, arranged in accordance with at least some embodiments described herein. The designing system 200 may include an ordering module 208, a constraint module 210, a pareto-front module 214, a validation module 220, a circuit simulation module 224, a database 230, an interface module 240, a memory 242, and a processor 244.

The interface module 240 may be configured to receive data concerning a circuit under design that includes analog components. For example, in some embodiments, the interface module 240 may be configured to interface with a person to receive data concerning the circuit to be designed. Alternately or additionally, the interface module 240 may be configured to interface with a device to receive data concerning the circuit to be designed.

The data received by the interface module 240 may identify digital and/or analog components included within the circuit and/or connections between the digital and/or analog components. The data may also include one or more parameters and/or one or more performance metrics for each of the analog components. Alternately or additionally, the data may include predetermined values for each of the selected parameters. Alternately or additionally, the data may include predetermined constraints for the circuit and/or one or more of the individual analog components. Alternately or additionally, the data may include one or more performance metrics for the circuit. Alternately or additionally, the data received by the interface module 240 may include low and/or high-level parameterized models for each of the analog components. Alternately or additionally, the data received by the interface module 240 may include models of the digital components within the circuit. Alternately or additionally, the data received by the interface module 240 may include design criteria for the circuit.

The interface module 240 may send the data to the other modules within the designing system 200. For example, the interface module 240 may send the data identifying the digital and/or analog components and the connections between the digital and/or analog components to the ordering module 208. The interface module 240 may also send the received predetermined constraints to the constraint module 210 and the received performance metrics, parameters, high-level and low-level models and other information to the pareto-front module 214 and the circuit simulation module 224.

The interface module 240 may include and/or may be coupled to one or more input devices and/or output devices to facilitate receiving data about the digital and/or analog components from the person and/or outputting circuit design results to the person. The one or more input and/or output devices may include, but are not limited to, a keyboard, a mouse, a touchpad, a microphone, a display, a touchscreen display, an audio speaker, or the like.

The ordering module 208 may be configured to receive the data identifying the digital and/or analog components within the circuit and order the components based on a topological sorting algorithm. In particular, the ordering module 208 may order the digital and/or analog components within the circuit based on a data flow within the circuit. The digital and/or analog components that are first in the data flow may be ordered before the digital and/or analog components that are last in the data flow.

The constraint module 210 may be configured receive the circuit constraints and/or other analog-component-specific constraints from the interface module 240. The constraint module 210 may also be configured to determine ordering constraints for each analog component based on the ordering of the analog components. The ordering constraints may be based on constraints that parameter values for a first analog component place on a second analog component when the second analog component is after the first analog component in the order of analog components within a circuit. In some embodiments, the ordering constraints may be based on the circuit constraints and/or other analog component specific constraints. The constraint module 210 may also be configured to send the circuit constraints, other analog component specific constraints, and/or the ordering constraints to the pareto-front module 214.

The pareto-front module 214 may be configured to receive the data identifying the ordered digital and/or analog components from the ordering module 208 and predetermined constraints and ordering constraints from the constraint module 210. Additionally, the pareto-front module 214 may be configured to receive the low-level models of the analog components from the interface module 240 or from the database 230.

Starting with a first analog component, and based on the order of the components determined by the ordering module 208, the pareto-front module 214 may be configured to determine one or more pareto-optimal design points additionally based on one or more of: the low level model for the first analog component, parameters for the first analog component, performance metrics for the first analog component, circuit constraints, ordering constraints, and constraints specific to the first analog component. To determine the one or more pareto-optimal design points, the pareto-front module 214 may perform simulations of the first analog component using the low-level model and varying values of the parameters to minimize or maximize the performance metrics within the circuit constraints and/or conform to the ordering constraints and/or constraints specific to the first analog component.

In some embodiments, the pareto-front module 214 may determine between 1 and 5 pareto-optimal design points. In other embodiments, the pareto-front module 214 may determine more than 5 pareto-optimal design points. In some embodiments, the number of pareto-optimal design points to be determined by the pareto-front module 214 may be predetermined or received through the interface module 240. Each of the pareto-optimal design points may be associated with the values of the performance metrics at the pareto-optimal design point. In some embodiments, the pareto-front module 214 may send the determined pareto-optimal design points and the associated performance metric values to the validation module 220 or store the determined pareto-optimal design points in the database 230.

After the pareto-front module 214 determines the pareto-optimal design points for the first analog component, the pareto-front module 214 may send the pareto-optimal design points to the constraint module 210. The constraint module 210 may use the pareto-optimal design points to determine ordering constraints for the analog components following the first analog component. By changing the ordering constraints to reflect constraints resulting from the pareto-optimal design points instead of the values of the predetermined parameters, the designing system 200 may design the circuit based on the interactions between the analog components in the circuit. Designing the circuit based on the interactions between the analog components in the circuit may produce a better-optimized circuit than designing each individual analog component in a circuit in isolation and then combining the individually designed analog components.

In some embodiments, the pareto-front module 214 may also be configured to determine a pareto-front for the first analog component based on the pareto-optimal design points. For example, in some embodiments, the pareto-front module 214 may use the pareto-optimal design points to interpolate the pareto-front for the first analog component.

The validation module 220 may be configured to obtain the pareto-optimal design points from the pareto-front module 214 or the database 230. For each pareto-optimal design point, the validation module 220 may be configured to simulate the first analog component using the high-level module of the analog component received from the interface module 240 or the database 230 and the parameter values of the respective pareto-optimal design point. The simulation of the first analog component using the high-level module may produce performance metrics. The values of the performance metrics from the high-level module may be compared to the values of the performance metrics associated with the respective pareto-optimal design point to validate the high-level module. If the values of the performance metrics from the high-level module are within a predetermined tolerance of the values of the performance metrics associated with the respective pareto-optimal design point, the high-level module may be validated as accurately modeling the analog component for the respective pareto-optimal design point. In some embodiments, if the high-level module fails to be validated by one or more of the pareto-optimal design points, the high-level module may be adjusted until it may be verified for each pareto-optimal design point. In other embodiments, if the high-level module fails to be validated by less than half or some other predetermined ratio of the pareto-optimal design points, the high-level module may still be verified.

After the high-level module of the first analog component is validated, the circuit simulation module 224 may be configured to simulate the circuit using the high-level modules for each of the analog components. In particular, the circuit simulation module 224 may use the circuit constraints, the high-level module for the first analog component using parameter values from one of the pareto-optimal design points, and high-level modules for the analog components without determined pareto-optimal design points using the predetermined parameters to simulate the circuit. In some embodiments, the circuit simulation module 224 may perform a simulation of the circuit for each of the pareto-optimal design points. In some embodiments, the designing system 200 may determine, based on the one or more performance metrics for the circuit or other considerations, which pareto-optimal design point yields the most optimized circuit.

In some embodiments, the circuit simulation module 224 may perform simulations of the circuit to determine if the design criteria of the circuit have been met. If the design criteria has not been met, in some embodiments, the pareto-front module 214, the validation module 220, and the circuit simulation module 224 may perform functionality similar to that described above with respect to the first analog component on one or more of the remaining analog components of the circuit ordered by the ordering module 208 until the design criteria is met.

In some embodiments, the circuit simulation module 224 may perform simulations of the circuit based on a pareto-front of the first analog component and the parameter values thereof and predetermined parameter values for the analog components without determined pareto-optimal design points. In some embodiments, the circuit simulation module 224 may not perform simulations of the circuit until more than one or all of the analog components of the circuit have determined pareto-optimal design points or determined pareto-fronts. In these and other embodiments, the pareto-front module 214 and the validation module 220 may perform functionality similar to that described above with respect to the first analog component on one or more of the remaining analog components of the circuit ordered by the ordering module 208. After pareto-optimal design points are determined for the one or more additional analog components, the circuit simulation module 224 may perform simulations of the circuit.

In some embodiments, the pareto-front module 214, the validation module 220, and the circuit simulation module 224 may perform functionality similar to that described above with respect to the first analog component on one or more of the remaining analog components of the circuit ordered by the ordering module 208 to determine a pareto-optimal front for the circuit.

In some embodiments, the processor 244 may be configured to execute computer instructions that cause the designing system 200 to perform the functions and operations described herein. The computer instructions may be loaded into the memory 242 for execution by the processor 244 and/or data generated, received, or operated on during performance of the functions and operations described herein may be at least temporarily stored in the memory 242.

Figure 3:
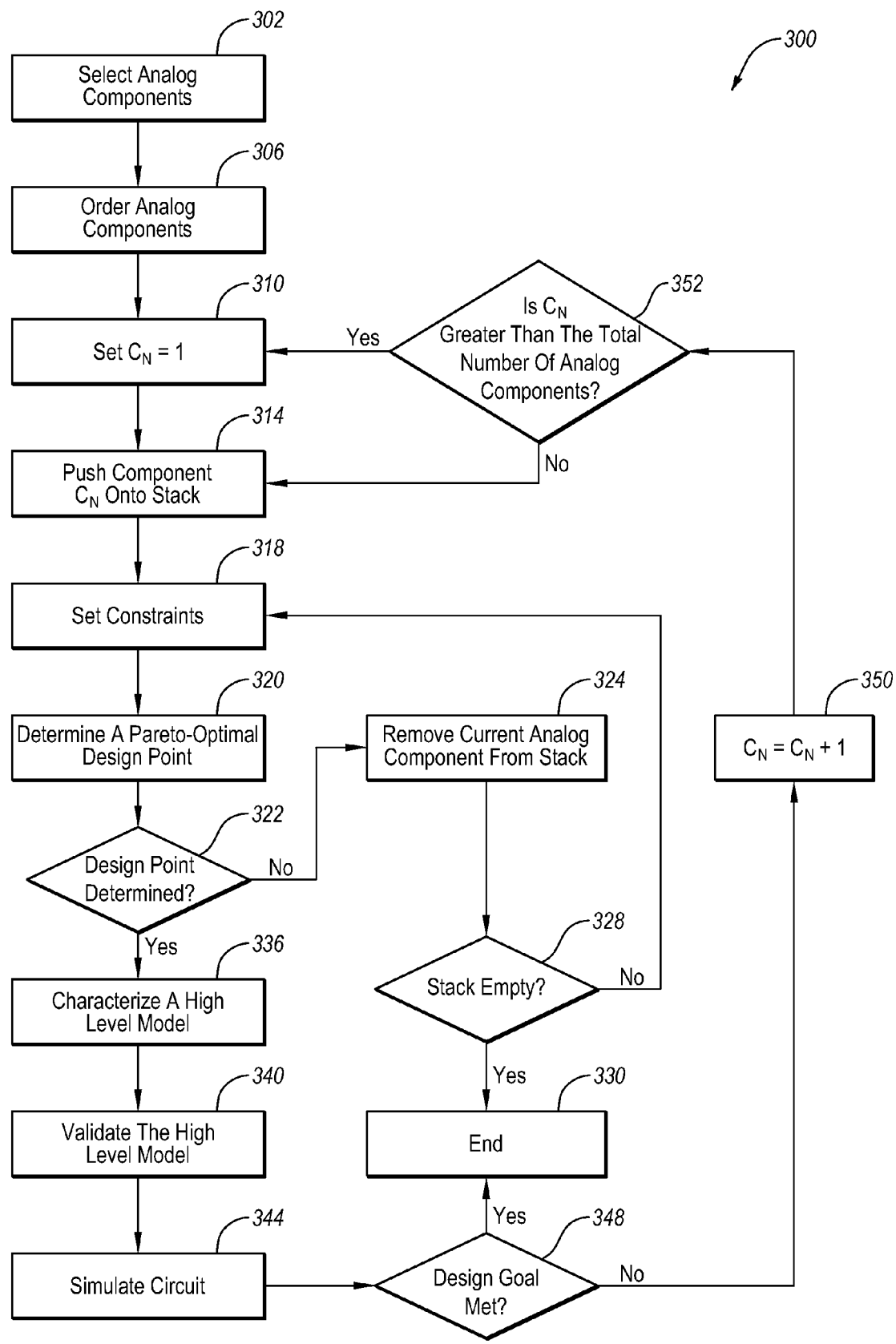
FIG. 3 is a flow chart of an example method of designing analog circuits.

FIG. 3 is a flow chart of an example method 300 of designing analog circuits, arranged in accordance with at least some embodiments described herein. The method 300 may be implemented, in some embodiments, by a designing system, such as the designing system 200 of FIG. 2. For instance, the processor 244 within the designing system 200 of FIG. 2 may be configured to execute computer instructions to cause the designing system 200 to perform operations for designing analog circuits as represented by one or more of blocks 302, 306, 310, 314, 318, 320, 322, 324, 328, 330, 336, 340, 344, 348, and 350 of the method 300. Although illustrated as discrete blocks, various blocks may be divided into additional blocks, combined into fewer blocks, or eliminated, depending on the desired implementation.

The method 300 may begin at block 302, in which analog components to be used within a circuit are selected. For example, the circuit may include a VCO and a CP. At block 302, the method 300 may include selecting the type of VCO and the type of CP for use in the circuit. For example, the method 300 may include selecting between a ring oscillator type VCO and a LC-tank oscillator type VCO for use in the circuit. In some embodiments, the circuit may include digital components as well as analog components.

At block 306, the components within the circuit may be ordered. In some embodiments, the components may be ordered based on a topological sorting algorithm. In particular, the components may be ordered based on a data flow within the circuit. The first analog component within the circuit may be given the number of 1 and the remaining ordered analog components may be given corresponding numbers based on the order of the analog components. For example, the fourth ordered analog component may be given the number of 4. More generally, any numbering suitable to indicate an order of the analog components may be implemented.

At block 310, a component number ($C_N$) may be set to 1. The component number may be a variable used by the method 300 to determine which analog component of the circuit is currently being designed.

At block 314, an analog component with a number equal to the component number may be pushed onto a top of an operations stack and be referred to as the current analog component.

At block 318, constraints may be set for the current analog component. The constraints that are set may be obtained from one or more sources. In some embodiments, the constraints may be predetermined constraints based on the circuit. Alternately or additionally, the constraints may be predetermined constraints for the current analog component. Alternately or additionally, the constraints may be constraints that are based on pareto-optimal design points generated for analog components that were ordered ahead of the current analog component.

At block 320, a pareto-optimal design point may be determined for the current analog component. The pareto-optimal design point may be determined based on one or more predetermined performance metrics, one or more predetermined parameters, and/or the constraints set in block 318 for the current analog component, using a low-level model for the current analog component. In some embodiments, multiple pareto-optimal design points may be generated for the current analog component. Alternately or additionally, a pareto-front may be generated for the current analog component.

At block 322, it is determined if a pareto-optimal design point was determined for the current analog component. In some embodiments, at block 320, no pareto-optimal design point may be determined based on the one or more predetermined performance metrics, the one or more predetermined parameters, and/or the constraints set in block 318 for the current analog component. The inability to determine a pareto-optimal design point may indicate that either the predetermined constraints or the constraints resulting from the pareto-optimal design points of other analog components may not be met based on the predetermined parameters. In these circumstances, block 322 may be followed by block 324. Block 322 may be followed by block 336 when one or more pareto-optimal design points are determined for the current analog component.

At block 336, a high-level model, such as a hardware definition language model, may be characterized using the pareto-optimal design point determined in block 320. The high-level model may automatically be generated through some external process or provided by a user. In some embodiments, the high-level model may be a parameterized model. Characterizing the high-level model may include populating the high-level model with the parameters associated with the pareto-optimal design point determined in block 320.

At block 340, the high-level model characterized in block 336 may be validated. To validate the high-level model, the high-level model may be simulated to produce performance metric values for the high-level model. The performance metric values for the high-level model may be compared to the performance metric values associated with the pareto-optimal design point as determined at block 320. The high-level model may be validated when the performance metric values for the high-level model are within a predetermined tolerance of the performance metric values associated with the pareto-optimal design point.

At block 344, the circuit may be simulated using the high-level modules for each of the analog components. Analog components with a determined pareto-optimal design point may be simulated using the pareto-optimal design point. Analog components without a determined pareto-optimal design point may be simulated using predetermined parameter values.

At block 348, it is determine if a design goal for the circuit has been met based on the simulation of the circuit at block 344. If the design goal is met, the circuit may have been sufficiently optimized and the method may proceed to block 330 where the method 300 ends. If the design goal is not meet, the method 300 may proceed to block 350.

At block 350, the component number may be advanced by one and the method 300 may proceed to block 314. When the method 300 returns to block 314, an analog component with a number, based on the ordering of the analog components, equal to the component number may be pushed onto the top of the operations stack and set as the current analog component and the method 300 may continue. As the method 300 continues, constraints may be set for the current analog component at block 318, a pareto-optimal design point may be selected for the current analog component at block 320, a high-level model may be characterized for the current analog component at block 336, the high-level model may be validated at block 340, and the circuit may again be simulated at block 344.

When the circuit is simulated at block 344, an additional analog component has a pareto-optimal design point. Having an additional analog component a pareto-optimal design point may further optimize the circuit and result in the circuit meeting a design goal for the circuit. Furthermore, the pareto-optimal design point for the additional analog component may be determined based on constraints resulting from the pareto-optimal design points of other analog components. Thus, each iteration of the method 300 may take into account the optimization of the previous analog component and may not be simply simulating analog components that are optimized through pareto-optimal design points individually.

Optionally, in some embodiments, for example when the circuit includes a feedback loop, the method 300 may include block 352. At block 352, when the component number is not greater than the total number of analog components in the circuit, the method 300 may proceed to block 314 as previously discussed herein. At block 352, when the component number is greater than the total number of analog components in the circuit, the method 300 may proceed to block 310.

At block 310, the component number may be set to 1 and in block 314 the first analog component based on the ordering of the analog components may be set as the current analog component. In these and other embodiments, all of the analog components from the circuit may be on the stack. As a result, the first analog component may have a pareto-optimal design point determined based on constraints resulting from the pareto-optimal design points of all of the other analog components in the circuit. Determining a pareto-optimal design point based on constraints resulting from the pareto-optimal design points of all of the other analog components in the circuit may result in further optimization of the analog component and thus further optimization of the circuit.

At block 320, a pareto-optimal design point may be determined for the current analog component as discussed previously.

At block 322, it is determined if a pareto-optimal design point was determined for the current analog component at block 320. As discussed previously, block 322 may be followed by block 336 when one or more pareto-optimal design points are determined for the current analog component. When no pareto-optimal design point may be determined based on the one or more predetermined performance metrics, the one or more predetermined parameters, and/or the constraints set in block 318 for the current analog component, block 322 may be followed by block 324.

At block 324, the current analog component may be removed from the operations stack. In some embodiments, removing the current analog component from the operations stack may result in the operations stack being empty. In other embodiments, removing the current analog component from the operations stack may result in an analog component below the current analog component on the operations stack becoming the current analog component.

At block 328, it is determined if the operations stack is empty. If the operations stack is empty, block 328 may be followed by block 330 and the method 300 may end. If the operations stack is not empty, block 328 may be followed by block 318.

At block 318, constraints may be set for the current analog component and at block 320 a pareto-optimal design point may be selected. This pareto-optimal design point may be different from the pareto-optimal design point previously selected for the current analog component. By selecting a new pareto-optimal design point, the one or more constraints resulting from the pareto-optimal design point may change and allow a pareto-optimal design point to be determined for the analog component following the current analog component for which a pareto-optimal design point was not previously able to be determined.

In some embodiments, the method 300 may be repeated for different component configurations not initially selected at block 302. The results from using the different analog component configurations may be compared and the best component may be selected.

In some embodiments, the method 300 may be modified to determine multiple pareto-optimal design points for each analog component within a circuit to accurately determine a pareto-front for each analog component. Based on the pareto-optimal front of each component, a pareto-optimal front for the circuit may also be determined. Using the pareto-optimal front for the circuit may allow for trade-offs of performance metrics of the circuit to be determined and analyzed allowing for a better design and/or optimization of the circuit.

Figure 4:
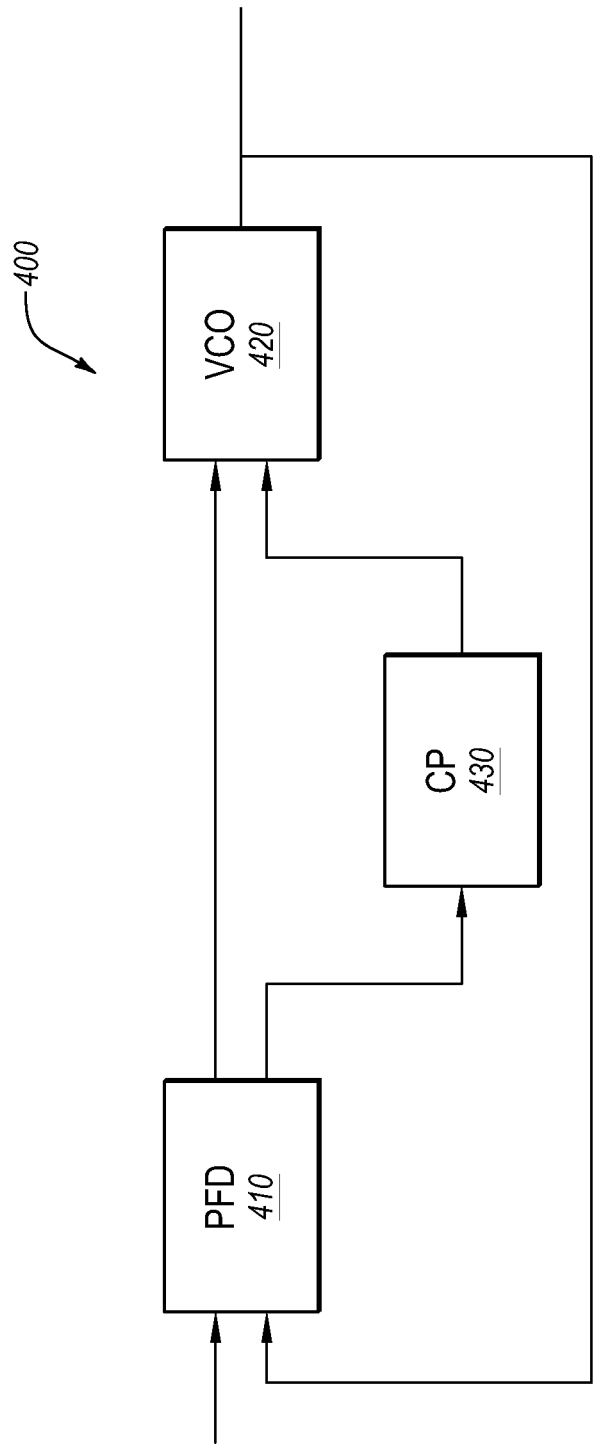
FIG. 4 illustrates an example circuit that may be designed using the method of FIG. 3.

FIG. 4 illustrates an example circuit 400 that may be designed using the method 300 of FIG. 3, arranged in accordance with at least some embodiments described herein. The circuit 400 may include a phase frequency detector (PFD) 410, a VCO 420, and a CP 430. In some embodiments, the circuit 400 may be a clock data recovery (CDR) circuit. In the circuit 400, the PFD 410 may be a digital component and the VCO 420 and the CP 430 may be analog components. The method 300 may be used to design the VCO 420 and the CP 430.

For example, and with combined reference to FIGS. 3 and 4, at block 302, analog components may be selected for the VCO 420 and the CP 430. For example, a ring oscillator VCO may be selected for the VCO 420 and a fly-back capacitor charge pump may be selected for the CP 430. In some embodiments, the VCO 420 may have parameters such as transistor widths, inductor sizes, and capacitor sizes. The VCO 420 may also have performance metrics such a quality factor, jitter, area, and power. In other embodiments, the VCO 420 may have different parameters and/or different performance metrics. In some embodiments, the CP 430 may have parameters such as transistors widths, and in particular, the widths of the transistors that determine the control currents for adjusting the controlling voltage within the CP 430. The CP 430 may also have performance metrics such as matching control currents, phase noise, and jitter. In other embodiments, the CP 430 may have different parameters and/or different performance metrics.

At block 306, the VCO 420 and the CP 430 may be ordered based on the topology of the circuit 400. The CP 430 may be selected to be first and may be given the number of 1 and the VCO 420 may follow the CP 430 and may be given the number of 2.

At block 310, the component number is set to 1. At block 314, the CP 430 is pushed onto the operation stack and becomes the current analog component. At block 318, constraints are set for the CP 430. The predetermined constraints may include minimal voltage swings, timing for changing the voltage, power requirements, sizing requirements, among others. Alternately or additionally, the constraints may be set based on the predetermined parameter values for the VCO 420.

At block 320, a pareto-optimal design point may be determined for the transistors widths with respect to the matching control currents, phase noise, jitter, and the predetermined constraints using a transistor level model of the CP 430. To determine the pareto-optimal design points, various design points with varying transistor widths may be used in the transistor level model of the CP 430 to generate the performance metrics of the CP 430 and information about the predetermined constraints. Transistor widths that are determined to meet the predetermined constraints, produce matching control currents, and reduce phase noise and jitter may be set as the pareto-optimal design point.

At block 336, a high-level model may be characterized using the pareto-optimal design point determined in block 320. At block 340, the high-level model may be validated. At block 344, the circuit 400 may be simulated using the high-level models for the VCO 420 and the CP 430. The simulation may use a high-level model of the VCO 420 with predetermined parameters as received by a user or from a database. The simulation may also use the high-level model of the CP 430 characterized in block 336 using the pareto-optimal design point for the CP 430. In some embodiments, the design goal may be met at block 348. If the design goal is not met, at block 350, the component number is set to 2.

At block 314, the VCO 420 is pushed onto the stack and becomes the current analog component. At block 318, constraints are set for the VCO 420. The predetermined constraints may include minimal voltage swings, timing for changing the voltage, power requirements, sizing requirements, among others. Additional constraints may also be set based on the pareto-optimal design point selected for the CP 430. For example, an additional constraint, such as an input impedance for the VCO 420 may be set based on the pareto-optimal design point for the CP 430.

At block 320, a pareto-optimal design point may be determined for the transistor widths, inductor sizes, and capacitor sizes with respect to the quality factor, jitter, area, and power of the VCO 420 and the constraints set at block 318 using a transistor level model of the VCO 420. To determine the pareto-optimal design points, various design points with varying transistor widths, inductor sizes, and capacitor sizes may be used in the transistor level model of the VCO 420 to generate the performance metrics of the VCO 420 and information about the set constraints. Transistor widths, inductor sizes, and capacitor sizes that are determined to meet the set constraints and produce optimizations for the quality factor, jitter, area, and power may be set as the pareto-optimal design point.

At block 336, a high-level model may be characterized using the pareto-optimal design point determined in block 320. At block 340, the high-level model may be validated. At block 344, the circuit 400 may be simulated using the high-level models for the VCO 420 and the CP 430. The simulation may use the characterized high-level model of the VCO 420 with the determined pareto-optimal design point of the VCO 420. The simulation may also use the high-level model of the CP 430 with the determined pareto-optimal design point of the CP 430. In some embodiments, the design goal may be met at block 348. If the design goal is not met, at block 350, the component number may be set to 3 and because the component number is greater than the number of analog components in the circuit 400, the method 300 may proceed to block 310 and the component number may be set to 1.

The method 300 may proceed as previously indicated, however, during this iteration, the constraints set at block 318 may result from the pareto-optimal design point determined for the VCO 420. By having pareto-optimal design points selected twice for the CP 430, the method 300 may take into account that the circuit 400 has a feedback loop.

Figure 5:
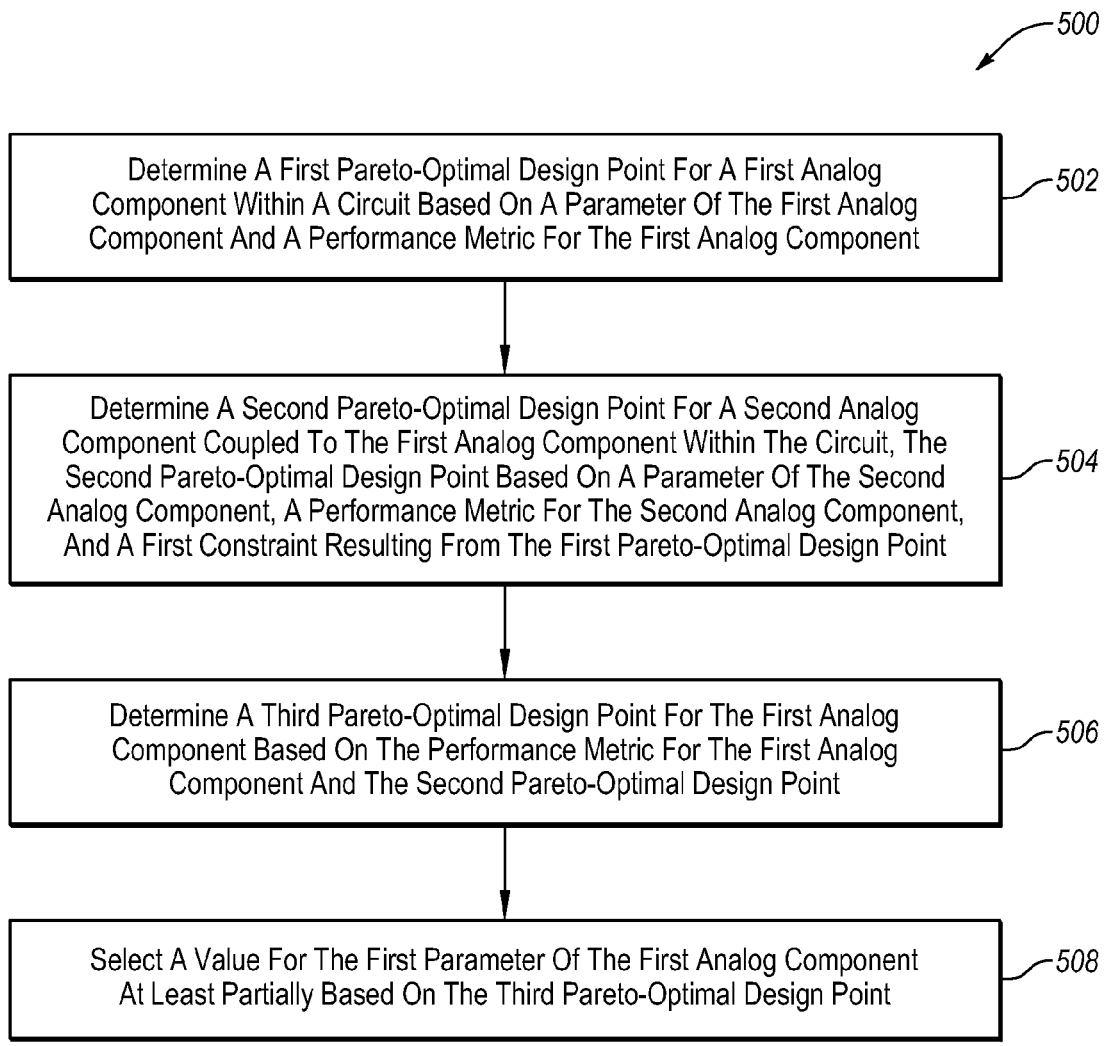
FIG. 5 is a flow chart of an example method of designing analog circuits, all arranged in accordance with at least some embodiments described herein.

FIG. 5 is a flow chart of an example method 500 of designing analog circuits, arranged in accordance with at least some embodiments described herein. The method 500 may be implemented, in some embodiments, by an optimization system, such as the designing system 200 of FIG. 2. For instance, the processor 244 within the designing system 200 of FIG. 2 may be configured to execute computer instructions to cause the designing system 200 to perform operations for designing analog circuits as represented by one or more of blocks 502, 504, 506, and/or 508 of the method 500. Although illustrated as discrete blocks, various blocks may be divided into additional blocks, combined into fewer blocks, or eliminated, depending on the desired implementation.

The method 500 may begin at block 502, in which a first pareto-optimal design point may be determined for a first analog component within a circuit based on a parameter of the first analog component and a performance metric for the first analog component. In some embodiments, the circuit may include analog components and digital components.

At block 504, a second pareto-optimal design point may be determined for a second analog component coupled to the first analog component within the circuit, the second pareto-optimal design point based on a parameter of the second analog component, a performance metric for the second analog component, and a first constraint resulting from the first pareto-optimal design point.

At block 506, a third pareto-optimal design point may be determined for the first analog component based on the performance metric for the first analog component and a second constraint resulting from the second pareto-optimal design point. In some embodiments, the first pareto-optimal design point, the second pareto-optimal design point, and the third pareto-optimal design point may be determined using transistor level modeling.

At block 508, a value may be selected for the first parameter of the first analog component at least partially based on the third pareto-optimal design point.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include characterizing a hardware language model of the second analog component based on the second pareto-optimal design point. Alternately or additionally, the method 500 may further include characterizing a hardware language model of the first analog component based on the third pareto-optimal design point.

In some embodiments, the method 500 may further include simulating the circuit based on the hardware language model of the first analog component and the hardware language model of the second analog component. Alternately or additionally, the method 500 may further include validating the hardware language model of the second analog component using the second pareto-optimal design point.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable media including RAM, ROM, EEPROM, CD-ROM or other optical disk storage, magnetic disk storage or other magnetic storage devices, or any other medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of designing an analog circuit, the method comprising:
   determining a first pareto-optimal design point for a first analog component within a circuit based on a parameter of the first analog component and a performance metric for the first analog component using a first simulation of a low level modeling simulation type;
   determining, using a processor, a second pareto-optimal design point for a second analog component using a second simulation that excludes the first analog component, the second simulation being of the low level modeling simulation type used for the first simulation, the second analog component being coupled to the first analog component within the circuit and the second pareto-optimal design point being based on a parameter of the second analog component, a performance metric for the second analog component, and a first constraint resulting from the first pareto-optimal design point; and
   selecting a first value for the parameter of the first analog component at least partially based on the first pareto-optimal design point.

2. The method of claim 1, wherein the low level modeling simulation type is based on transistor level modeling.

3. The method of claim 1, further comprising characterizing a hardware language model of the second analog component based on the second pareto-optimal design point.

4. The method of claim 3, further comprising characterizing a hardware language model of the first analog component based on the first pareto-optimal design point.

5. The method of claim 4, further comprising simulating the circuit based on the hardware language model of the first analog component and the hardware language model of the second analog component.

6. The method of claim 3, further comprising validating the hardware language model of the second analog component using the second pareto-optimal design point.

7. The method of claim 1, further comprising:
   determining a third pareto-optimal design point for the first analog component based on the performance metric for the first analog component and a second constraint resulting from the second pareto-optimal design point; and
   selecting a second value for the parameter of the first analog component at least partially based on the third pareto-optimal design point.

8. A method of designing an analog circuit, the method comprising:
   selecting a plurality of analog components for a circuit;
   ordering the analog components;
   determining, using a processor, at least one pareto-optimal design point for a parameter of each analog component using a simulation of a low-level model of each analog component, the simulation used for each of the respective analog components being of the same low level modeling simulation type, the pareto-optimal design point for each analog component being based on a performance metric, the parameter for the respective analog component, and constraints resulting from pareto-optimal design points for analog components ahead of the respective analog component within the ordering of the analog components; and
   characterizing a high-level model for each of the analog components based on the pareto-optimal design point of the respective analog component.

9. The method of claim 8, wherein the low-level model is a transistor level model.

10. The method of claim 8, wherein the analog components are ordered based on a topological order of the circuit.

11. The method of claim 8, wherein the high-level model is a hardware language model.

12. The method of claim 11, further comprising validating the hardware language model for each of the analog components based on the pareto-optimal design point for the respective analog component.

13. The method of claim 11, further comprising simulating the circuit based on the hardware language model of each of the analog components.

14. The method of claim 8, wherein the circuit comprises analog components and digital components.

15. A processor configured to execute computer instructions stored in a computer-readable storage medium to cause a system to perform operations for designing an analog circuit, the operations comprising:
   selecting a plurality of analog components for a circuit;
   ordering the analog components;
   determining at least one pareto-optimal design point for a parameter of each analog component using a simulation of a low-level model of each analog component, the simulation used for each of the respective analog components being of the same low level modeling simulation type, the pareto-optimal design point for each analog component being based on a performance metric, the parameter for the respective analog component, and constraints resulting from pareto-optimal design points for analog components ahead of the respective analog component within the ordering of the analog components; and
   characterizing a high-level model for each of the analog components based on the pareto-optimal design point for the respective analog component.

16. The processor of claim 15, wherein the low-level model is a transistor level model.

17. The processor of claim 15, wherein the high-level model is a hardware language model.

18. The processor of claim 17, wherein the operations further comprise simulating the circuit based on the hardware language model of each of the analog components.

19. The processor of claim 17, wherein the operations further comprise validating the hardware language model for each of the analog components based on the pareto-optimal design point for the respective analog component.

20. The processor of claim 15, wherein the circuit comprises analog components and digital components.

* * * * *